United States Patent [19]
Oota et al.

[11] Patent Number: 5,263,318
[45] Date of Patent: Nov. 23, 1993

[54] AFTER-BURNER SYSTEM

[75] Inventors: Nobuyuki Oota, Kariya; Yasutoshi Yamada, Chita; Motonobu Araki, Anjo; Souichi Matsushita, Susono, all of Japan

[73] Assignee: Aisin Seiki Kabushiki Kaisha, Kariya, Japan

[21] Appl. No.: 878,490

[22] Filed: May 5, 1992

[30] Foreign Application Priority Data

May 8, 1991 [JP] Japan .................. 3-131586

[51] Int. Cl.⁵ ............................. F01N 3/36; F01N 3/38
[52] U.S. Cl. ........................................ 60/286; 60/284; 60/300; 60/303
[58] Field of Search .................. 60/286, 303, 284, 300

[56] References Cited

U.S. PATENT DOCUMENTS

| | | | |
|---|---|---|---|
| 2,895,292 | 7/1959 | Wentworth | 60/286 |
| 2,937,490 | 5/1960 | Calvert | 60/286 |
| 3,779,014 | 12/1973 | Nohira | 60/286 |
| 3,846,981 | 11/1974 | Paczkowski | 60/286 |
| 4,233,811 | 11/1980 | Masaki | 60/286 |
| 5,097,815 | 3/1992 | Oota et al. | |

FOREIGN PATENT DOCUMENTS 52-16165  5/1973  Japan.
63-68714  3/1988  Japan.

Primary Examiner—Douglas Hart
Attorney, Agent, or Firm—Burns, Doane, Swecker & Mathis

[57] ABSTRACT

An after-burner system comprises an exhaust passage of an engine, a catalyzer to purify Hydrocarbon and located into the exhaust passage, a temperature sensor located in the catalyzer, a spark gap located in the exhaust passage at an upper stream side of the catalyzer, an ignition plug used for an ignition, and a central controller having an igniting controller controlling an ignition at the ignition plug and an after-burner controller controlling an electric discharge at the spark gap, wherein while the temperature sensor outputs a logical HIGH signal, the electric discharge is generated at the spark gap.

9 Claims, 10 Drawing Sheets

AFTER-BURNER SYSTEM

BACKGROUND OF THE INVENTION

1. Field of the Invention

The present invention relates to an after-burner system and more particularly to an after-burner system for an exhaust emission control system of an engine to reduce Hydrocarbon in exhaust gas.

2. Description of the Related Art

In recent years, a severe emission control has been needed for an engine to protect the Earth environment from pollution. Particularly, it is necessary to reduce Hydrocarbon. Hydrocarbon is contained in unburned mixture which is generated by an imperfect burning in the engine. A catalyzer to purify Hydrocarbon is located in an exhaust pipe of the engine. Much Hydrocarbon is released from the exhaust pipe to the atmosphere when the engine temperature is cold, since the catalyzer does not act sufficiently when the catalyzer temperature is cold. That is, the catalyzer acts sufficiently when the catalyzer temperature is in a certain high temperature region (ex. over 200 degrees Celsius).

For example, to increase the catalyzer temperature, the catalyzer is heated by an after-burner system. A conventional after-burner system 800 for an engine 801 shown in FIG. 10, is disclosed in Japanese Patent Laid-open No. 63(1988)-68714. Here, the engine 801 has an intake passage 802 and an exhaust passage 803. A catalyzer 804 is inserted into the exhaust passage 803. Both ends 805, 806 of a bypass passage 807 are connected with the exhaust passage 803 at an upper stream side of the catalyzer 804. A switching valve 808 is located at a connecting point between the exhaust passage 803 and the end 805. The switching valve 808 is controlled by a control unit 809 which has input thereto a signal from a temperature sensor 810. An adsorbent 811 is inserted into the bypass passage 807. A fuel reforming device 812 is inserted into the exhaust passage 803 at an upper stream side of the switching valve 808. The fuel reforming device 812 has an input passage 813 and an output passage 814. One end of the output passage 814 opens into the exhaust passage 803 at an upper stream side of the catalyzer 804. A filter 815 is inserted into the output passage 814. A passage 816 connects the filter 815 with the intake passage 802.

In the after-burner system 800, when the engine 801 is cold, the catalyzer 804 is also cold. At this time, the fuel reforming device 812 reforms fuel (ex. methyl alcohol) into Hydrogen and other components. Hydrogen separated at the filter 815 is only supplied to the catalyzer 804 via the output passage 814. At the catalyzer 804, Hydrogen is burned and the catalyzer 804 is heated. Here, an igniting device (not shown) requires a strong igniting power for rapid heating of the catalyzer.

SUMMARY OF THE INVENTION

Accordingly, it is a primary object of the present invention to provide an igniting device having a strong igniting power for an after-burner system.

The above and other objects are achieved by an after-burner system according to the present invention which comprises an exhaust passage of an engine, a catalyzer to purify Hydrocarbon which is located in the exhaust passage, a temperature sensor located in the catalyzer, a spark gap located in the exhaust passage at an upper stream side of the catalyzer, an ignition plug used for an ignition, and a central controller having an igniting controller for controlling an ignition at the ignition plug and an after-burner controller for controlling an electric discharge at the spark gap, wherein while the temperature sensor outputs a logical HIGH signal, the electric discharge is generated at the spark gap.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE INVENTION

Figure 1:
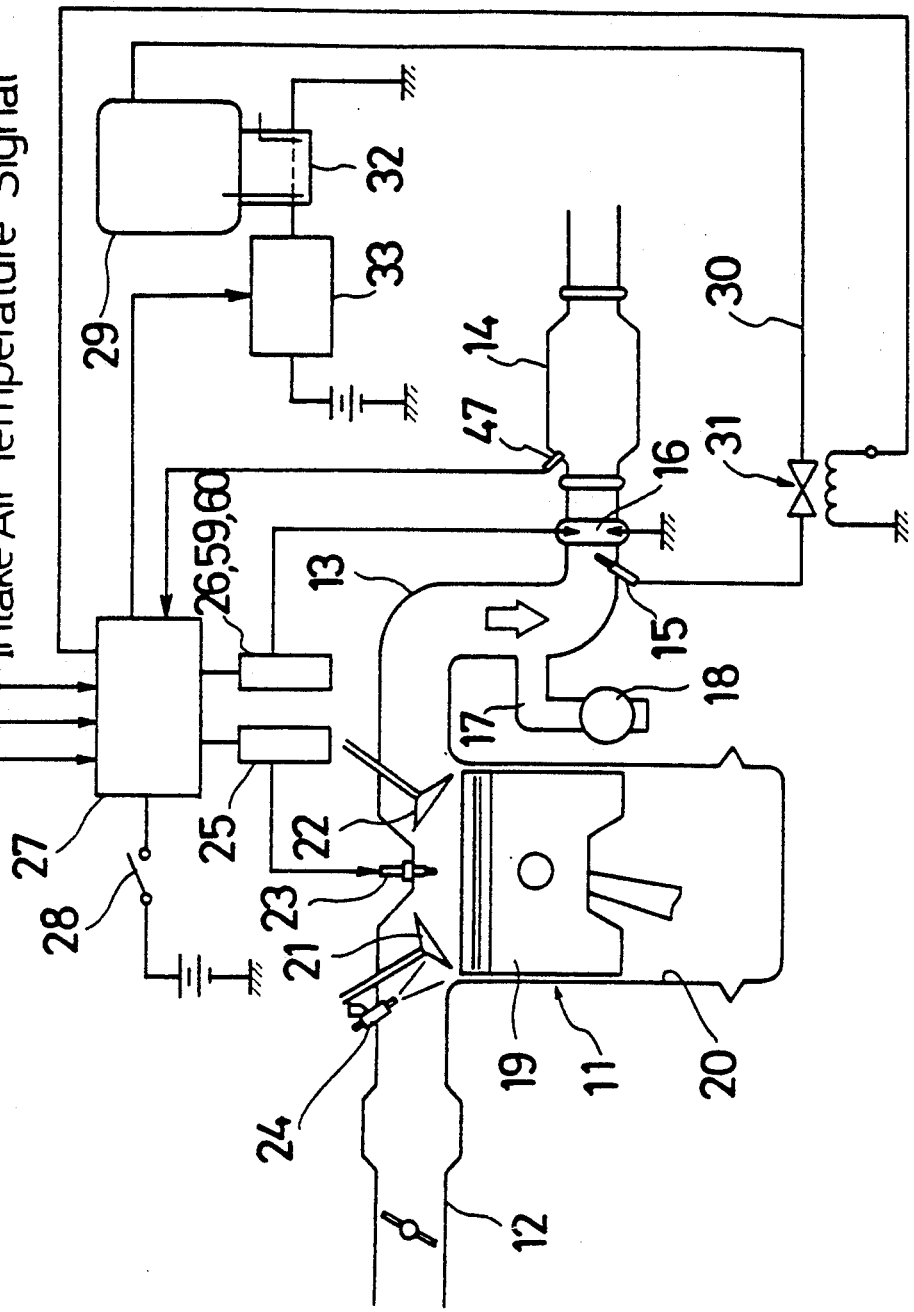
FIG. 1 is a schematic view of a first embodiment of an after-burner system according to the invention.

Reference is made initially to FIG. 1 wherein a first embodiment of an after-burner system 10 is shown. Here, an engine 11 has an intake passage 12 and an exhaust passage 13. A catalyzer 14 is inserted into the exhaust passage 13. A nozzle 15 and a spark gap 16 are located in the exhaust passage 13 at an upper stream side of the catalyzer 14. A passage 17 opens into the exhaust passage 13 at an upper stream side of the nozzle 15, and an air pump 18 is inserted into the passage 17.

A piston 19 reciprocates in a cylinder 20 (in general, an engine has plural cylinders) of the engine 11. Intake and exhaust valves 21, 22 and an ignition plug 23 are located upon the cylinder 20, and a fuel injector 24 is located in the intake passage 12.

First and second coils 25, 26 are controlled by a central controller 27. The first coil 25 is connected with the ignition plug 23 and the second coil 26 is connected with the spark gap 16. A catalyzer temperature signal, an ignition timing signal, a cooling water temperature signal and an intake air temperature signal etc. are inputted into the central controller 27. The catalyzer temperature signal is outputted from a temperature sensor 47 located in the catalyzer 14. A switch 28 supplies and shuts an electric energy to the central controller 27.

Hydrogen is supplied to the nozzle 15 from a tank 29 via a line 30. A solenoid valve 31 opens and closes the line 30 according to an order from the central controller 27. A Hydrogen generator 32 is connected with the tank 29, and is controlled by controller 33 which acts according to the central controller 27.

Figure 2:
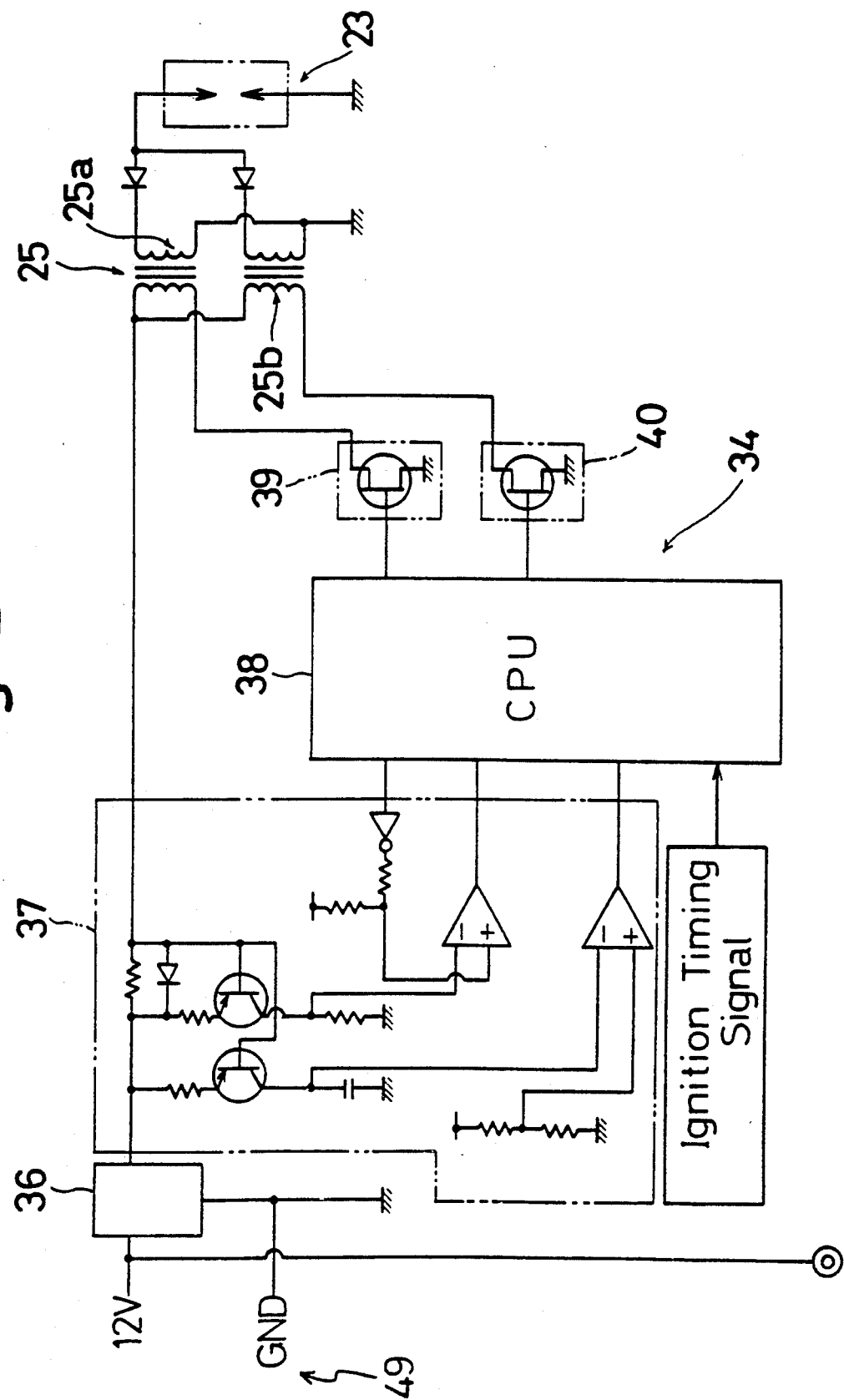
FIG. 2 is a circuit diagram of an igniting controller of FIG. 1.
Figure 3:
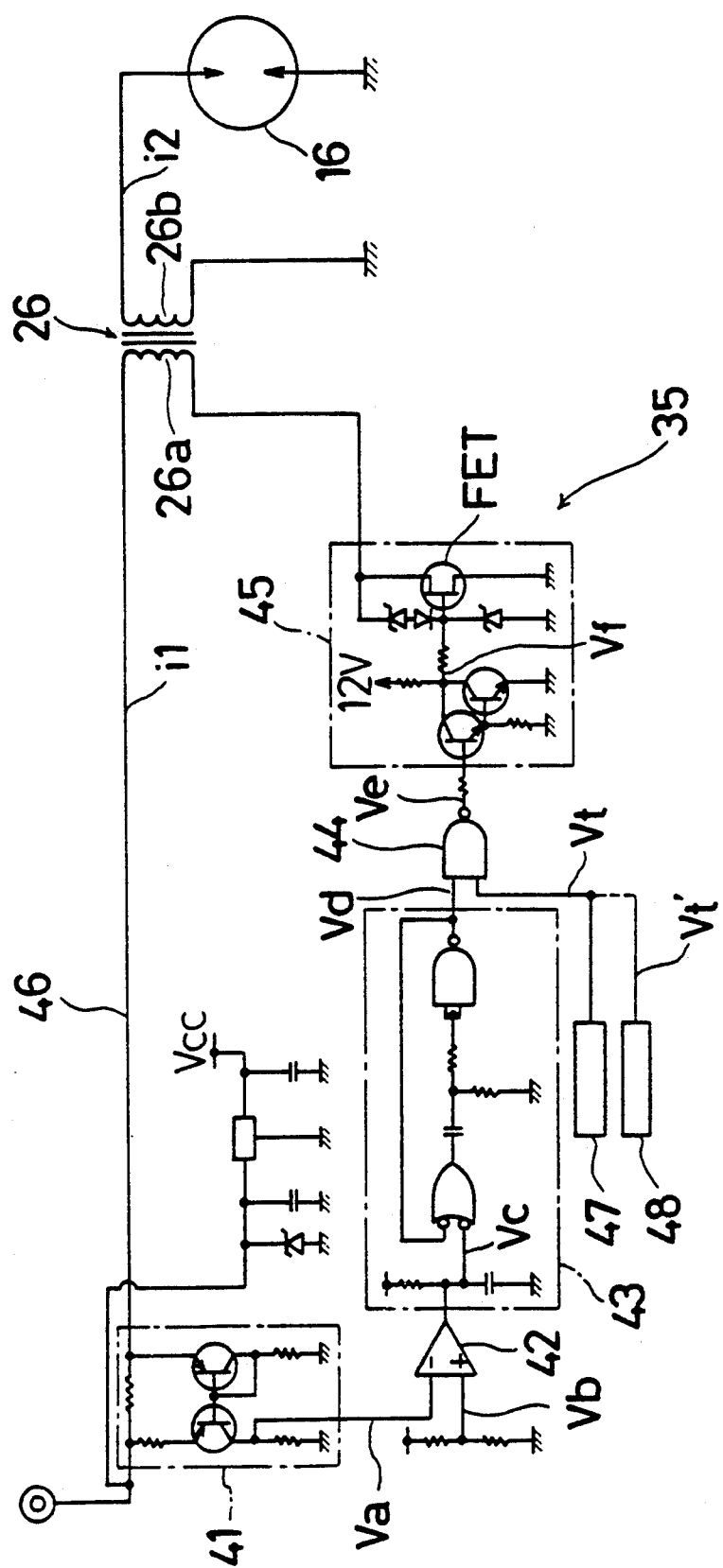
FIG. 3 is a circuit diagram of a first embodiment of an after-burner controller of FIG. 1, and is connected with FIG. 2 at a mark ⓞ.

In this embodiment, the central controller 27 comprises an igniting controller 34 (shown in FIG. 2) and an after-burner controller 35 (shown in FIG. 3).

Referring to FIG. 2 wherein the igniting controller 34 comprises a DC-DC convertor circuit 36, a sensing circuit 37, a CPU (Central Processing Unit) 38, a first output circuit 39 and a second output circuit 40. The ignition timing signal is inputted into the CPU 38. The sensing circuit 37 senses an electric current flowing in the first coil 25. A voltage of an electric source (12 V to GND (ground)) 49 is converted to sufficiently high voltage for ignition by the DC-DC convertor 36. The first coil 25 comprises a main-coil 25a and a sub-coil 25b. When the ignition plug 23 is during ignition period, the converted high voltage is alternately supplied to the main-coil 25a and the sub-coil 25b according to the first and second output circuits 39, 40. In each secondary winding of the main-coil 25a and the sub-coil 25b, electric current which is as same as electric current ia, ib shown in FIG. 6 flows. While the switch 28 is turned on, continuous electric discharge is carried out at the ignition plug 23 when the ignition is needed according to the ignition timing signal.

Referring to FIG. 3 wherein the first embodiment of the after-burner controller 35 comprises a current mirror circuit 41, a comparator 42, a monostable multivibrator 43, a NAND circuit 44 and an output circuit 45. The current mirror circuit 41 senses an electric current i1 flowing at a primary coil 26a of the second coil and outputs a signal voltage Va corresponding to the electric current i1 to the comparator 42. The comparator 42 compares the signal voltage Va with a reference voltage Vb and outputs a signal voltage Vc to the monostable multivibrator 43. A signal voltage Vd which is outputted from the monostable multivibrator 43 and a signal voltage Vt which is outputted from the temperature sensor 47 are inputted into the NAND circuit 44. A signal voltage Ve which is outputted from the NAND circuit 44 is inputted into the output circuit 45, and a signal voltage Vf which is formed in the output circuit 40 according to the signal voltage Ve controls a condition of a FET (Field Effect Transistor). An electric current flowing at the spark gap 16 is provided as i2.

Figure 4:
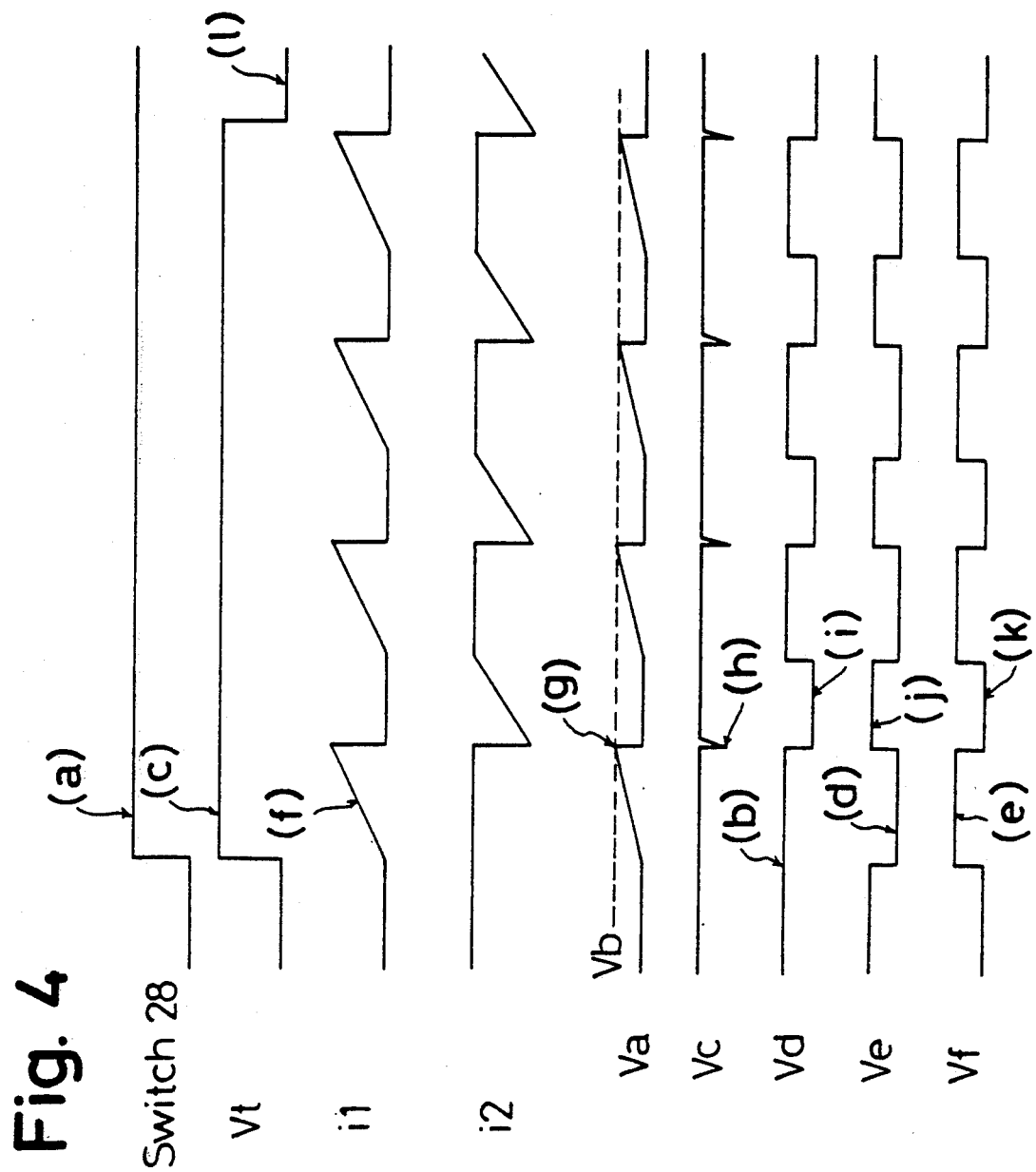
FIG. 4 is a timing chart of a device in FIG. 3.

Referring to FIG. 4, the action of the after-burner controller 35 is described. When the switch 28 is turned on (a), the signal voltage Vd is logical HIGH (b). At this time, if the catalyzer temperature is lower than a certain temperature, the signal voltage Vt is logical HIGH (c). Thus, the signal voltage Ve is logical LOW (d) and the signal voltage Vf is logical HIGH (e), and the FET is turned on. Therefore, the electric current i1 flows in the primary winding 26a (f), and the primary winding 26a is charged.

With the passing of the charging of the primary winding 26a, when the signal voltage Va becomes equal with the reference voltage Vb (g), the signal voltage Vc turns from logical High to logical LOW in a moment (h). At the same time, the signal voltage Vd turns to logical LOW (i) in a time when the monostable multivibrator 43 sets. Further, the signal voltage Vt has been logical HIGH (c) so that the signal voltage Ve turns to logical HIGH (j) and the signal voltage Vf turns to logical LOW (k), and the FET is turned off. Therefore, the electric current i1 flowing in the primary winding 26a is shut off and the electric current i2 is generated in a secondary winding 26b. Thus, an electric discharge is generated at the spark gap 16 and a spark is generated therein.

While the signal voltage Vt has been logical HIGH (c), an electric charge in the primary winding 26a and the electric discharge at the spark gap 16 are acted alternately (multiple and intermittent spark is generated in the spark gap 16), the Hydrogen is supplied to the exhaust passage 13 from the nozzle 15, and air is supplied to the exhaust passage 13 from the air pump 18. Thus, when the engine 11 is started in the cold condition, the Hydrocarbon released from the engine 11 is burned with the air, the Hydrogen and the multiple spark in a moment. So, the Hydrocarbon is reduced, the catalyzer 14 is immediately warmed with a burning heat of the Hydrocarbon and acts immediately after the starting of the engine.

The catalyzer 14 has been warmed and the catalyzer temperature exceeds the certain temperature, the signal voltage Vt turns to logical LOW (l). After that, the electric charge in the primary winding 26a and the electric discharge at the spark gap 16 are stopped.

It is noted that a signal voltage Vt' which is outputted from a timer circuit 48 is available to be inputted to the NAND circuit 44 instead of the signal voltage Vt which is outputted from the temperature sensor 47. The timer circuit 48 outputs the logical HIGH signal in a fixed time (ex. 10~20 sec.).

Figure 5:
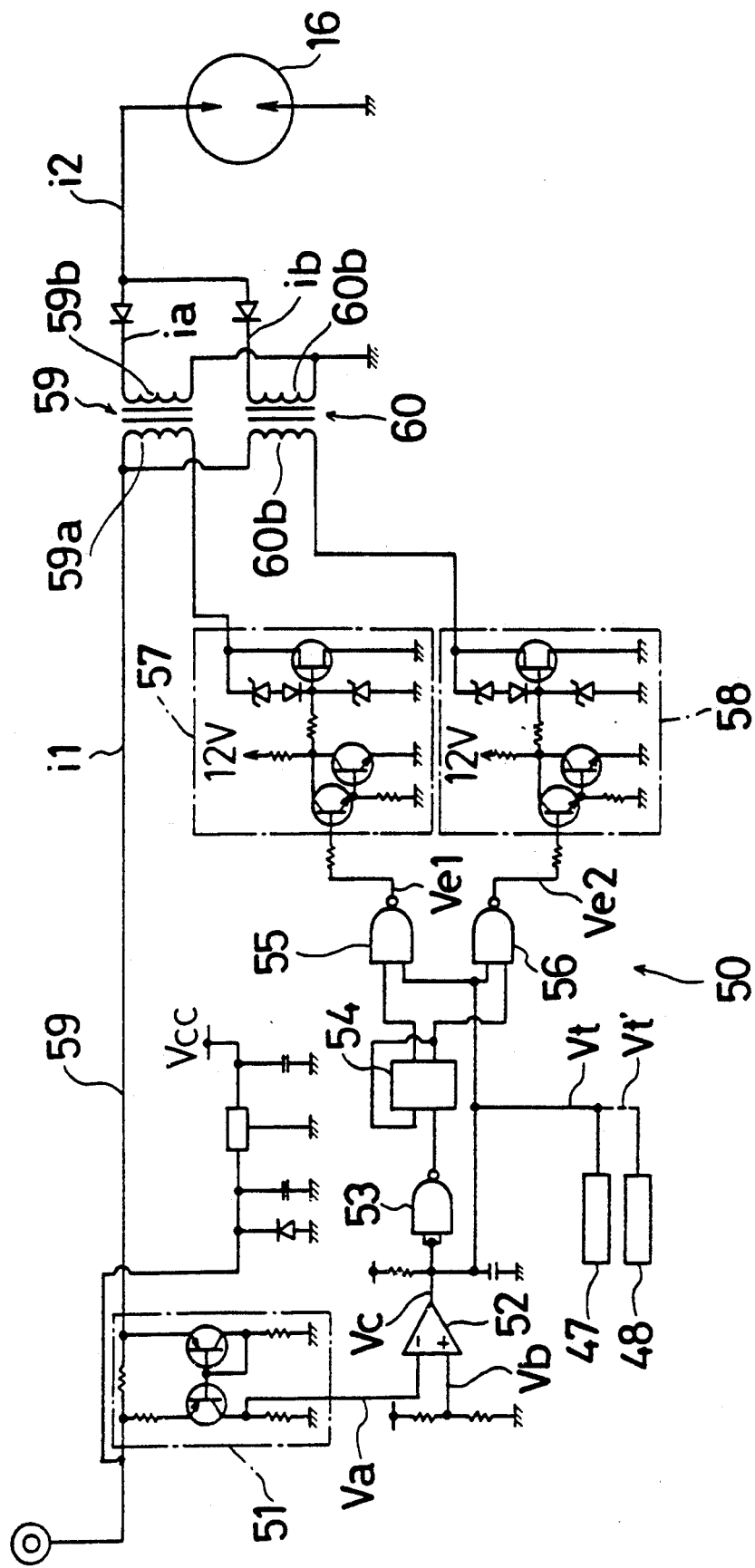
FIG. 5 is a circuit diagram of a second embodiment of an after-burner controller of FIG. 1, and is connected with FIG. 2 at a mark ⓞ.

Referring to FIG. 5 the second embodiment of the after-burner controller 50 comprises a current mirror circuit 51, a comparator 52, an invertor 53, a Flip-flop circuit 54, a first NAND circuit 55, a second NAND circuit 56, a first output circuit 57 and a second output circuit 58. The current mirror circuit 51 senses an electric current i1 flowing at primary coils 59a, 59b of a main-coil 59 and a sub-coil 60 and outputs a signal voltage Va corresponding to the electric current i1 to the comparator 52. The comparator 52 compares the signal voltage Va with a reference voltage Vb and outputs a signal voltage Vc to the invertor 53. The Flip-flop circuit 54 outputs logical HIGH and LOW signals to the first and second NAND circuits 55, 56. The signal voltage Vt which is outputted from the temperature sensor 47 are inputted into the first and second NAND circuits 55, 56. A signal voltage Ve1 which is outputted from the first NAND circuit 55 is inputted into the first output circuit 57, and a signal voltage Ve2 which is outputted from the second NAND circuit 56 is inputted into the second output circuit 58. The first and second output circuits 57, 58 have FET1 and FET2, respectively. An electric current flowing at the spark gap 16 is provided as i2 which comprises an electric current ia generated in the main-coil 59 and an electric current ib generated in the sub-coil 60.

Figure 6:
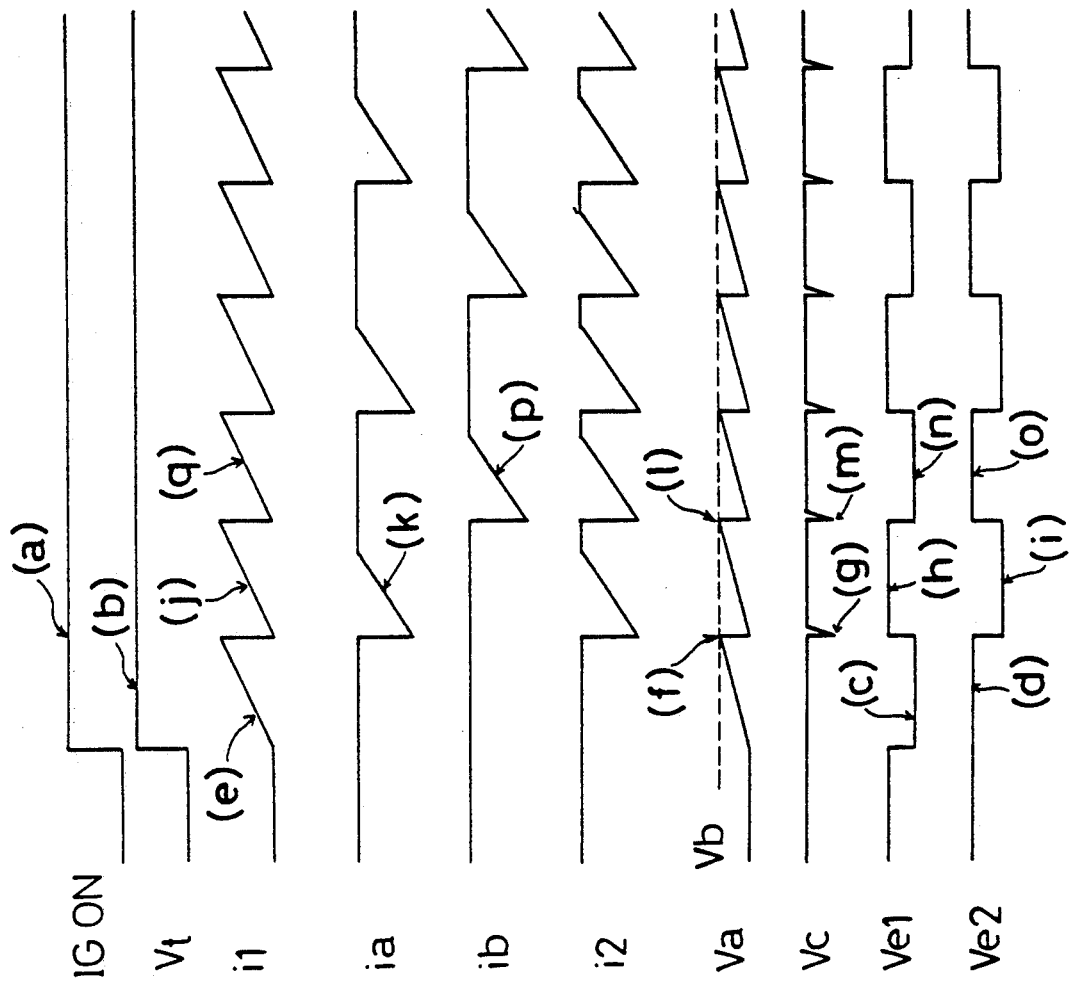
FIG. 6 is a timing chart of a device in FIG. 5.

Referring to FIG. 6, the action of the after-burner controller 50 is described. When the switch 28 is turned on (a), the Flip-flop circuit 54 outputs the logical HIGH signal to the first NAND circuit 55 and the logical LOW signal to the second NAND circuit 56. At this time, if the catalyzer temperature is lower than a certain temperature, the signal voltage Vt is logical HIGH (b). Thus, the signal voltage Ve1 is logical LOW (c) and the signal voltage Ve2 is logical HIGH (d), and the FET1 is turned on only. Therefore, the electric current i1 flows in the primary winding 59a (e), and the primary winding 59a is charged.

With the passing of the charging of the primary winding 59a, when the signal voltage Va becomes equal with the reference voltage Vb (f), the signal voltage Vc turns from logical High to logical LOW in a moment (g). At the same time, the Flip-flop circuit 54 outputs the logical LOW signal to the first NAND circuit 55 and the logical HIGH signal to the second NAND circuit 56. Thus, the signal voltage Ve1 turns to logical HIGH (h) and the signal voltage Ve2 turns to logical LOW (i), and the FET1 is turned off and the FET2 is turned on only. Therefore, the electric current i1 flowing in the primary winding 59a is shut off and the electric current ia is generated in the secondary winding 59b (k). Thus, an electric discharge is generated at the spark gap 16 and a spark is generated therein. At this time, the electric current i1 flows in a primary winding 60a of the sub-coil 60 (j), and the primary winding 60a is charged.

With the passing of the charging of the primary winding 60a, when the signal voltage Va becomes equal with the reference voltage Vb (l), the signal voltage Vc turns from logical High to logical LOW in a moment (m). At the same time, the Flip-flop circuit 54 outputs the logical HIGH signal to the first NAND circuit 55 and the logical LOW signal to the second NAND circuit 56. Thus, the signal voltage Ve1 turns to the logical LOW (n) and the signal voltage Ve2 turns to logical HIGH (o), and the FET1 is turned on and the FET2 is turned off. Therefore, the electric current i1 flowing in the primary winding 60a is shut off and the electric current ib is generated in a secondary winding 60b of the sub-coil 60 (p). Thus, an electric discharge is generated at the spark gap 16 and a spark is generated therein. At this time, the electric current i1 flows in a primary winding 59a of the main-coil 59 (q), and the primary winding 59a is charged.

Therefore, the electric discharge at the spark gap 16 is carried out by the main-coil 59 and the sub-coil 60 continuously so that a number of spark increases comparing with the first embodiment.

Figure 7:
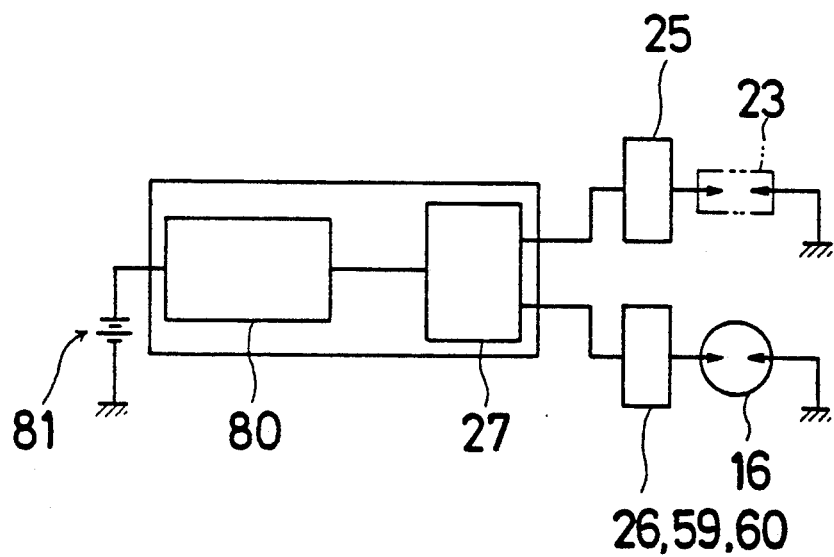
FIG. 7 is a schematic view of a second embodiment of an after-burner system according to the invention.

Referring to FIG. 7 wherein the second embodiment of an after-burner system is shown, only the differences with respect to the other embodiment are shown. In FIG. 2, the DC-DC convertor circuit 36 is inserted into the igniting controller 34 only. However, the DC-DC convertor circuit 80 is located between a electric source 81 and the central controller 27 shown in FIG. 7. As a result, a converted voltage is supplied to the after-burner controllers 35, 50 in addition to the ignition controller 34 so that the charging time of the coils 26, 59, 60 is hasty.

Figure 8:
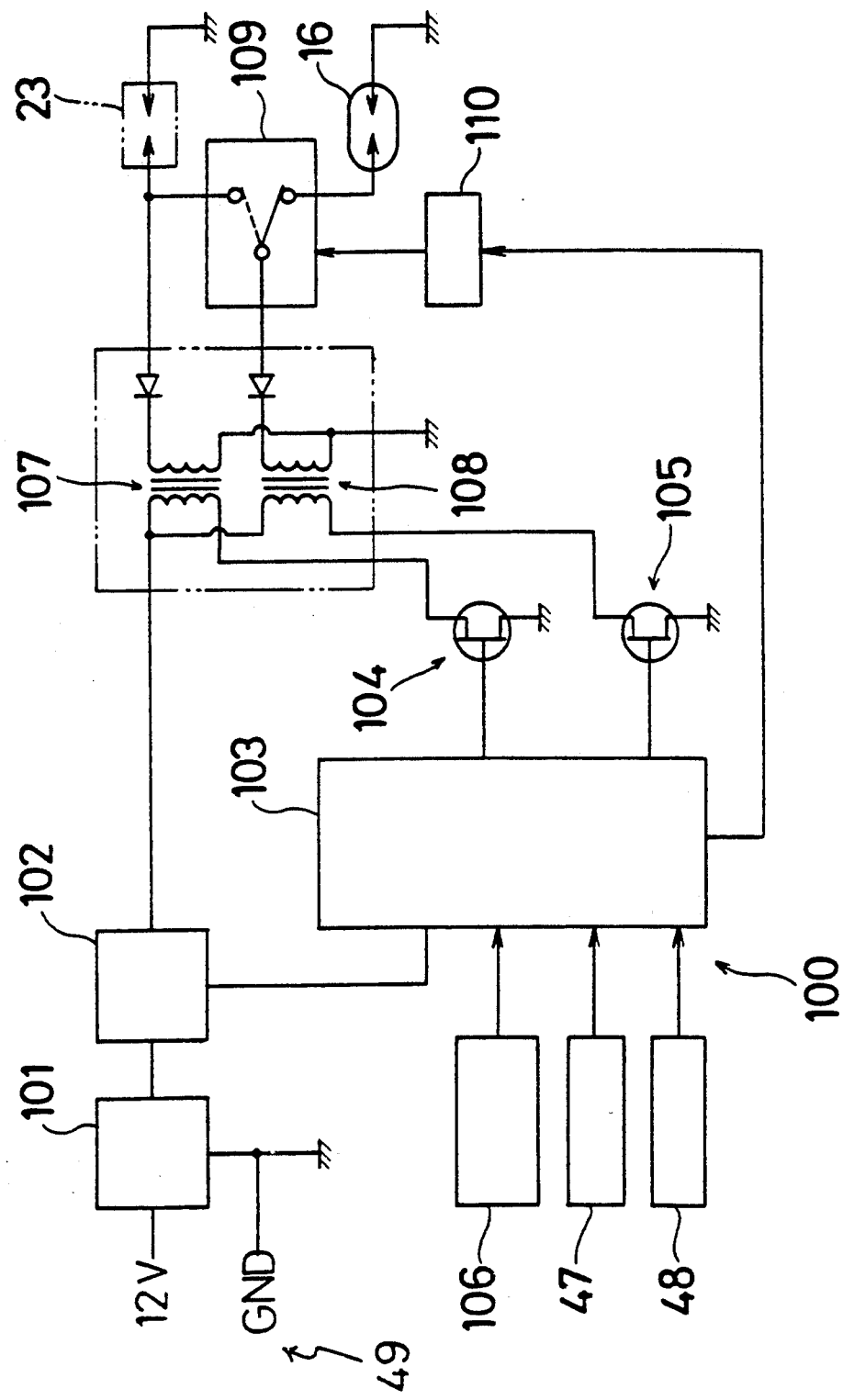
FIG. 8 is a schematic view of a third embodiment of an after-burner system according to the invention.

Finally, referring to FIG. 8 wherein the third embodiment of an after-burner system is shown, only the differences with respect to the other embodiments are shown. A circuit of a central controller 100 is similar to the circuit of the igniting controller 34 shown in FIG. 2. The central controller 100 comprises a DC-DC convertor circuit 101, a sensing circuit 102, a CPU (Central Processing Unit) 103, a first output circuit 104 and a second output circuit 105. An ignition timing signal 106, a signal outputted from the temperature sensor 47 or a signal outputted from the timer circuit 48 are inputted into the CPU 103. The sensing circuit 102 senses each electric current flowing in primary windings of the ignition coil 107 and the auxiliary coil 108. A secondary winding of the ignition coil 107 is always connected with the ignition plug 23, and a secondary winding of the auxiliary coil 108 is selectively connected with the ignition plug 23 or the spark gap 16 via a switch 109. The switch 109 is controlled by a switching controller 110.

Figure 9:
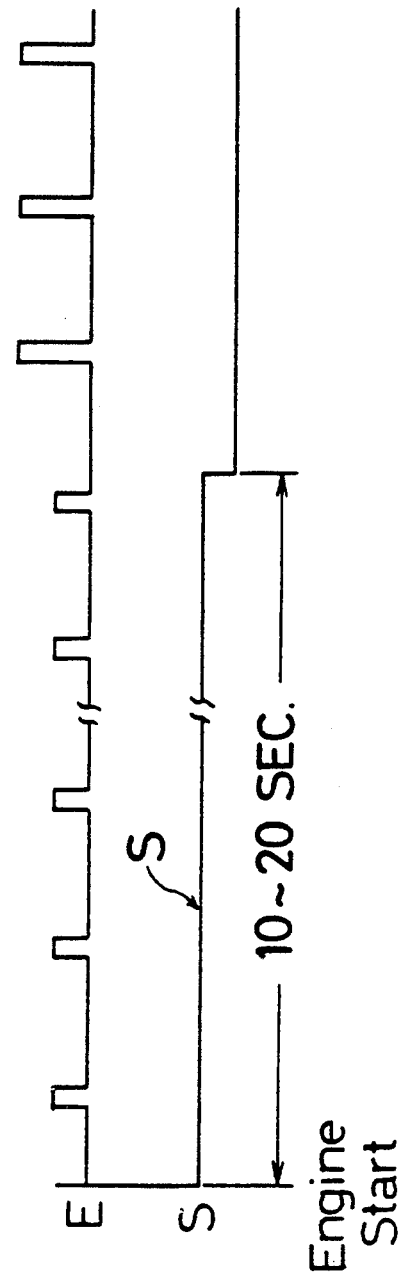
FIG. 9 is a timing chart of a device in FIG. 8.
Figure 10:
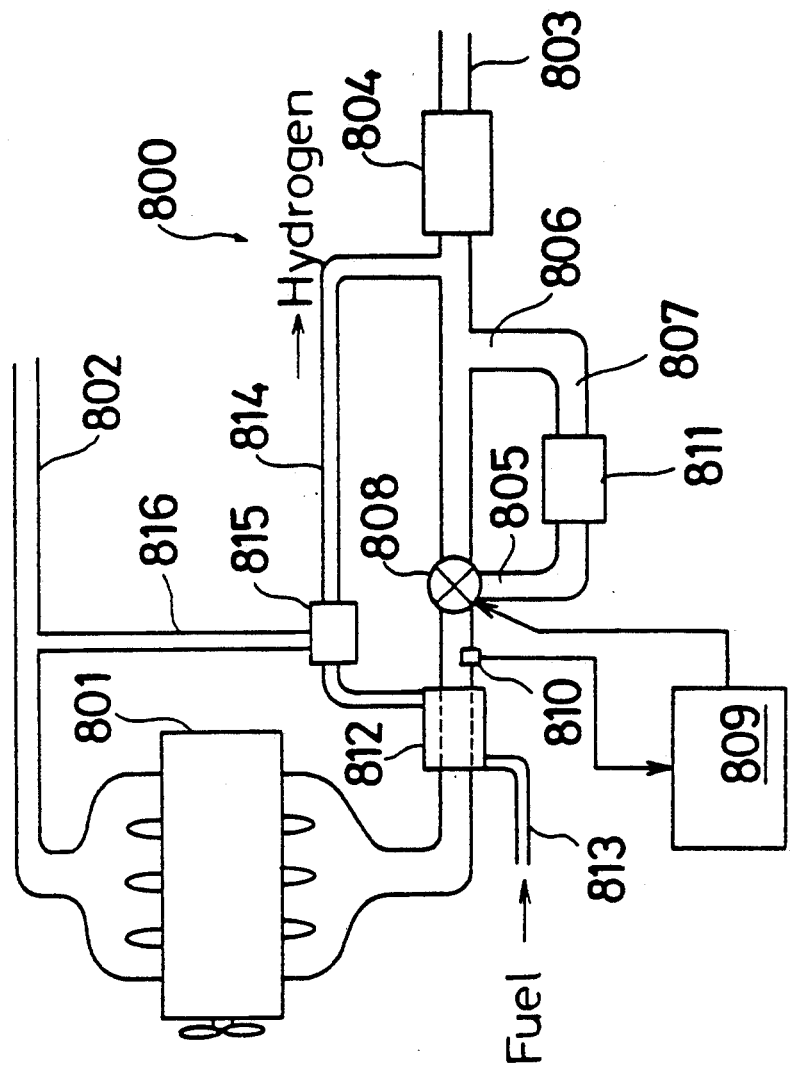
FIG. 10 is a schematic view of a conventional after-burner system.

In each secondary winding of the ignition coil 107 and the auxiliary coil 108, electric current which is the same as electric current ia, ib shown in FIG. 6 flows. If the catalyzer temperature is lower than a certain temperature, the switching controller, for example, outputs a signal S shown in FIG. 9. Namely, when the engine 11 is started, the auxiliary coil 108 is connected with the spark gap 16 for a fixed time (ex. 10~20 sec.). After the auxiliary coil 108 is connected with the ignition plug 23, an igniting energy supplied to the ignition plug 23 increases as is apparent from the graph E shown in FIG. 9.

Obviously, numerous modifications and variations of the present invention are possible in light of the above teachings. It is therefore to be understood that within the scope of the appended claims, the invention may be practiced otherwise than as specifically described herein.

What is claimed is:

1. An after-burner system comprising:
   an exhaust passage of an engine;
   a catalyzer located in the exhaust passage for purifying hydrocarbon;
   a temperature sensor located in the catalyzer;
   a spark gap located in the exhaust passage at an upstream side of the catalyzer;
   an ignition plug for causing ignition;
   means for supplying hydrogen to the exhaust passage upstream of the spark gap; and
   a central controller having an igniting controller for controlling ignition at the ignition plug and an after-burner controller for controlling an electric discharge at the spark gap,
   wherein while the temperature sensor outputs a logical HIGH signal, the electric discharge is generated at the spark gap.

2. An after-burner system as set forth in claim 1 further comprising an air pump for supplying air to the exhaust pipe upstream of the spark gap, said means for supplying hydrogen including a nozzle connected to the exhaust passage and a hydrogen tank connected to the nozzle for providing a supply of hydrogen to the nozzle.

3. An after-burner system as set forth in claim 1 further comprising a DC-DC convertor circuit which is located between an electric source and the central controller.

4. An after-burner system as set forth in claim 1, wherein first and second coils are controlled by the central controller, and the first coil is connected with the ignition plug and the second coil is connected with the spark gap.

5. An after-burner system as set forth in claim 4, wherein the after-burner controller comprises:
   a current mirror circuit for sensing an electric current flowing in a primary winding of the second coil;
   a comparator for comparing a signal outputted from the current mirror circuit with a reference signal;
   a monostable multivibrator for setting a time when the monostable multivibrator outputs a logical LOW signal according to a signal outputted from the comparator;
   a NAND circuit into which is inputted a signal outputted from the monostable multivibrator and a signal outputted from the temperature sensor; and
   an output circuit having a field effect transistor which is turned on and turned off according to a signal outputted from the NAND circuit,
   wherein when the field effect transistor is turned on, the primary winding is charged, and
   when the field effect transistor is turned off, an electric discharge is generated at the spark gap.

6. An after-burner system as set forth in claim 4, wherein the after-burner controller comprises:
   a current mirror circuit which sense an electric current flowing in a primary winding of the second coil;
   a comparator for comparing a signal outputted from the current mirror circuit with a reference signal;
   a monostable multivibrator for setting a time when the monostable multivibrator outputs a logical LOW signal according to a signal outputted from the comparator;
   a NAND circuit into which is inputted a signal outputted from the monostable multivibrator and a signal outputted from a timer circuit; and
   an output circuit having a field effect transistor which is turned on an turned off according to a signal outputted from the NAND circuit,
   wherein when the field effect transistor is turned on, in the primary winding is charged, and
   when the field effect transistor is turned off, an electric discharge is generated at the spark gap is acted.

7. An after-burner system as set forth in claim 4, wherein the second coil comprises a main-coil and a sub-coil.

8. An after-burner system as set forth in claim 7, wherein the after-burner controller comprises:
   a current mirror circuit for sensing an electric current flowing in primary windings of the main-coil and the sub-coil;
   a comparator for comparing a signal outputted from the current mirror circuit with a reference signal;
   a flip-flop circuit outputting a logical HIGH signal and a logical LOW signal according to a signal outputted from the comparator;
   first and second NAND circuits inputted with the signals outputted from the flip-flop circuit and a signal outputted from the temperature sensor; and
   first and second output circuits having a first and second field effect transistor which are turned on an turned off alternately according to a signal outputted from the first and second NAND circuits.

9. An after-burner system as set forth in claim 7, wherein the after-burner controller comprises:
   a current mirror circuit for sensing an electric current flowing in primary windings of the main-coil and the sub-coil;
   a comparator for comparing a signal outputted from the circuit mirror circuit with a reference signal;
   a flip-flop circuit for outputting a logical HIGH signal and a logical LOW signal according to a signal outputted from the comparator;
   first and second NAND circuits into which are inputted the signals outputted from the flip-flop circuit and a signal outputted from a timer circuit; and
   first and second output circuits having first and second field effect transistor which are turned on and turned off alternately according to a signal outputted from the first and second NAND circuits.

* * * * *

UNITED STATES PATENT AND TRADEMARK OFFICE
CERTIFICATE OF CORRECTION

PATENT NO. : 5,263,318
DATED : November 23, 1993
INVENTOR(S) : Nobuyuki OOTA et al It is certified that error appears in the above-indentified patent and that said Letters Patent is hereby corrected as shown below:

TITLE PAGE

In Section [75], delete "Araki" and insert -- Akaki --.

Signed and Sealed this

Nineteenth Day of April, 1994

Attest:

BRUCE LEHMAN

Attesting Officer   Commissioner of Patents and Trademarks